(12) United States Patent
Harda et al.

(10) Patent No.: US 9,926,011 B2
(45) Date of Patent: Mar. 27, 2018

(54) METHOD AND SYSTEM FOR STEERING ASSISTANCE IN A VEHICLE (71) Applicant: VOLVO CAR CORPORATION, Gothenburg (SE)

(72) Inventors: Peter Harda, Torslanda (SE); Jonas Nilsson, Molndal (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 15/172,300

(22) Filed: Jun. 3, 2016

(65) Prior Publication Data

US 2016/0368534 A1 Dec. 22, 2016

(30) Foreign Application Priority Data

Jun. 16, 2015 (EP) ..................................... 15172371

(51) Int. Cl.
*B62D 15/02* (2006.01)
*G06K 9/00* (2006.01)
*H04N 7/18* (2006.01)

(52) U.S. Cl.
CPC ....... *B62D 15/025* (2013.01); *G06K 9/00798* (2013.01); *H04N 7/181* (2013.01)

(58) Field of Classification Search
CPC ........... B62D 15/025; G06K 9/000798; H04N 7/181; G05D 1/0246
See application file for complete search history.

(56) References Cited

U.S. PATENT DOCUMENTS

| 2008/0189012 A1* | 8/2008 | Kaufmann | B62D 15/029 701/41 |
|---|---|---|---|
| 2009/0216404 A1 | 8/2009 | Maass | |
| 2013/0006473 A1 | 1/2013 | Buerkle et al. | |
| 2014/0188345 A1 | 7/2014 | Tamura et al. | |
| 2015/0151725 A1* | 6/2015 | Clarke | B60W 30/00 701/28 |

FOREIGN PATENT DOCUMENTS

| DE | 102007061900 | 6/2009 |
| DE | 102010032064 | 5/2011 |
| DE | 102012011301 | 12/2013 |
| WO | 2006037445 | 4/2006 |

OTHER PUBLICATIONS

Extended European Search Report for European Application No. EP 15172371.5, Completed by the European Patent Office, dated Dec. 15, 2015, 7 Pages.

* cited by examiner

*Primary Examiner* — Aaron L Troost (74) *Attorney, Agent, or Firm* — Brooks Kushman P.C.

(57) ABSTRACT

A method for steering assistance in an autonomous or semi-autonomous vehicle comprises identifying an upcoming curve, detecting an inner lane boundary and an outer lane boundary of the upcoming curve, determining a safety distance between the vehicle and the outer lane boundary, and controlling a position of the vehicle in the curve with respect to the inner and outer lane boundary such that the vehicle is at a distance from the outer lane boundary which is equal to or larger than the safety distance. A steering assistance system is also described capable of performing the method for steering assistance.

15 Claims, 6 Drawing Sheets

METHOD AND SYSTEM FOR STEERING ASSISTANCE IN A VEHICLE

CROSS-REFERENCE TO RELATED APPLICATIONS

This application claims foreign priority benefits under 35 U.S.C. § 119(a)-(d) to European patent application number EP 15172371.5, filed Jun. 16, 2015, which is incorporated by reference in its entirety.

TECHNICAL FIELD

The present disclosure relates to a method and system for steering assistance in a vehicle. In particular, the present disclosure relates to a method and system for increasing safety and driver trust in semi-automated or fully automated vehicles.

BACKGROUND

The development of driver assistance systems in vehicles such as lane keeping, braking assist, parking assist and adaptive cruise control systems has led to vehicles which can function more or less autonomously.

With the introduction of new driver assistance systems follows requirements that the systems are safe to use and also that the driver of the vehicle feels comfortable in trusting the systems to function satisfactorily.

Steering assistance systems commonly identify the lane boundaries of the road and act to position the vehicle close to the center of the lane to maximize the distance to the lane boundaries. However, it is not always desirable to position the vehicle at the center of the lane. For example, for a multi lane road with meeting traffic it may be desirable to position the vehicle further away from the meeting traffic to increase safety margins.

Moreover, when traveling through a curve the optimum path is typically not the center of the lane. A human driver would often cut the curve both to reduce the driving distance and to maximize the curvature of the vehicle path in order to reduce the centrifugal forces acting on the vehicle and on the driver, thereby increasing the comfort of the driver. Moreover, by maximizing the radius of the travel path through the curve, there is less risk that the vehicle will loose traction. To maximize the radius of curvature of a path through a curve, the vehicle is positioned towards the outer lane boundary when approaching the curve and then moves towards the inner lane boundary in the curve. When approaching the exit of the curve, the vehicle is again positioned closer to the outer lane boundary, thereby passing the curve along a path having a larger radius then a path following the center of the lane.

In US2013/0006473, a method and control unit for determining a cutting trajectory of a curve section of a roadway is described. The method and system aims at providing an automated approach mimicking human behavior. Accordingly, it is suggested to position vehicle to reduce the curvature to minimize lateral acceleration (g-force) on vehicle and vehicle occupants.

SUMMARY

In view of above-mentioned of the prior art, it is an object of the present disclosure to provide a method and system for improving safety and driver trust in a steering assistance system for a vehicle.

According to a first embodiment of the disclosure, there is provided a method for steering assistance in a vehicle, the method comprising identifying an upcoming curve, detecting an inner and an outer lane boundary of the upcoming curve, determining a safety distance between the vehicle and the outer lane boundary and controlling a position of the vehicle in the curve with respect to the inner and outer lane boundary such that said vehicle is at a distance from said outer lane boundary which is equal to or larger than said safety distance.

A lane boundary may in the present context be a visually identifiable lane marking, such as a painted lane marking. The lane boundary may also be a barrier or a wall delimiting the lane in which the vehicle is traveling, or the lane boundary may be in the form of ribs on the road surface configured to make a driver aware of when the vehicle is traveling on the lane boundary. A lane boundary may also be the edge of the road if other lane boundaries are not present or are not identifiable.

The safety distance may be defined as a distance to the outer lane boundary in the travel direction of the vehicle. The safety distance may also be defined as a distance to the point of the outer lane boundary which is closes to the vehicle, which typically is in a direction approximately perpendicular to the travel direction of the vehicle.

The present disclosure is based on the realization that, in a vehicle comprising an autonomous or semi-autonomous steering assistance system, it desirable to provide a steering assistance method which both increases driver trust in the vehicle steering assistance system and which provides a high degree of safety in case of failure or malfunctioning of the steering assistance system. The improved safety is achieved through the determined safety distance and the resulting positioning of the vehicle. In case of a failure of the steering assistance system, secondary or auxiliary systems may be present for remedying or for alleviating the potential effects of the failure, such as preventing that the vehicle would continue in a straight line and either depart the road or travel into adjacent lanes if the steering assistance system should fail when the vehicle is traveling through a curve. Such secondary or auxiliary systems may include secondary steering systems, emergency braking systems or other systems which can take precautionary measures to prevent a collision or road departure. In order to maximize the time for secondary systems to take action, the defined safety distance may be determined so that there is sufficient time available for secondary systems to react and take action. As an alternative to automatic systems, the driver may be alerted in case of failure or malfunction of the steering assistance system, so that the driver can take control of the steering wheel and steer the vehicle through the curve or stop the vehicle in a controlled manner. In principle, it is desirable that the vehicle is as close as possible to the inner lane boundary throughout the curve to maximize the time available for corrective actions in case of failure of the steering assistance system. However, if the vehicle is too close to the inner lane boundary, the driver may also feel discomfort and small steering disturbances may lead to road departure to the inside of the curve. Therefore, the safety distance is determined so that the driver feels confident that the steering assistance system is functional and that the vehicle is positioned so that sufficient time is available for handling an unplanned event. In practice, the safety distance may be determined based on a number of different parameters as will be further discussed below.

Furthermore, the safety distance may be defined as a distance from the vehicle to the lane boundary in a travel direction of the vehicle, as a lateral distance from the vehicle to the lane boundary, or a combination of the two as will be discussed in greater detail in the following.

According to one embodiment of the disclosure, the method may further comprise positioning the vehicle, before entering said curve, so that a distance between the vehicle and the outer lane boundary is larger than or equal to said safety distance when said vehicle enter said curve. Accordingly, the vehicle may start to move towards a position in the lane as soon as the curve is identified. Thereby, the driver can feel confident that the steering assistance system is functional and the vehicle is not closer to the outer lane boundary than the determined safety distance when the vehicle enters the curve. Furthermore, by ensuring that the vehicle is correctly positioned in the lane already at a sufficient distance from the curve prevents any sharp and uncomfortable steering actions when the vehicle enter the curve.

In one embodiment of the disclosure, the safety distance may be determined so that a vehicle is positioned closer to the inner lane boundary than to the outer lane boundary. If the only information available to the steering assistance system is information about the lane boundaries, the most straightforward approach for determining the safety distance is to position the vehicle offset for the lane center towards the inner lane boundary, while still keeping a sufficient distance to the inner lane boundary. The minimum allowable distance to the inner lane boundary may for example be predefined distance, or it may be determined as a function of the lane width.

According to one embodiment of the disclosure, the safety distance may be determined based on a velocity of the vehicle. It can be assumed that a secondary system needs a certain time to react and to take action. Therefore, a higher velocity of the vehicle leads to a reduced time to react for a given safety distance. Accordingly, a higher vehicle velocity would require a longer safety distance, and vice versa for a lower vehicle velocity.

According to one embodiment of the disclosure, the safety distance may be determined based on a curvature of the curve. When the vehicle is located in the curve, the safety distance may be defined as the distance to the outer lane boundary in the tangential direction of the vehicle (i.e. the longitudinal direction, or the travel direction). In comparison, when the vehicle is traveling in a straight path, for example when approaching a curve, the safety distance can be defined in a direction perpendicular to the travel direction. Accordingly, comparing two curves having the same lane width but different curvature, the curve having the smaller radius of curvature would have a smaller longitudinal distance to the outer lane boundary in the tangential direction of the vehicle. Therefore, the safety distance may be different for curves of different radius due to the difference in longitudinal distance from the vehicle to the outer lane boundary.

In one embodiment of the disclosure, the safety distance may be determined based on road surface conditions of the curve. The surface condition of the road has a large impact on the braking distance of a vehicle, and also on the possibility to change the direction of travel of the vehicle. Therefore, road conditions can be taken into account when determining the safety distance. Relevant parameters defining the road condition may for example include surface type, damage to the road surface or the presence of ice, snow or water.

In one embodiment of the disclosure, the safety distance may be determined based on an inclination angle of the road. The inclination of the road will also influence steering capabilities of the vehicle. For example, the vehicle may travel uphill or downhill through a curve, and the curve may be banked or otherwise inclined in a lateral direction, thereby influencing steering capabilities of the vehicle.

According to one embodiment of the disclosure, the safety distance may advantageously be equal to or larger than an estimated braking distance of the vehicle to ensure that there is a sufficient distance for achieving a complete stop, or to sufficiently reduce the speed of the vehicle. The braking distance can be estimated based only on the velocity of the vehicle, or it may be estimated using additional information for example regarding the surface properties of the road as discussed above.

Furthermore, the safety distance may advantageously be based on properties of the outer lane boundary. The outer lane boundary may consist of a lane marking painted on the road surface. However, the lane boundary may also be a wire-rope barrier, a W-beam barrier, a concrete barrier or the like. Depending on the type of lane boundary, the safety distance may be determined in different ways. For example, a lane having a lane boundary in the form of a wire-rope barrier may have a shorter safety distance compared to a lane with a lane marking where there are adjacent lanes where other vehicles may be present, since a wire-rope barrier prevents the vehicle from leaving the lane even if the vehicle hits the barrier at some speed.

According to one embodiment of the disclosure, the safety distance may be determined based on an evaluation of objects beyond the outer lane boundary. Another possible input parameter for determining the safety distance is what lies beyond the lane boundary. If there are no obstacles on the other side of the outer lane boundary, and if the risk of damage to the vehicle, its occupants or people outside of the vehicle is estimated as being low in case the vehicle passes over the lane boundary, the safety distance can be set lower compared to if there are high risk objects on the other side of the lane boundary. Examples of low risk objects and surroundings include plain ground, low vegetation, small ditches and the like. High risk objects and surroundings include trees, other vehicles, rocks, cliffs etc.

In one embodiment of the disclosure, the safety distance may be determined based on properties of an auxiliary system. For example, the safety distance may be set so that there is sufficient time for an auxiliary system to activate and take corrective action. The auxiliary system may for example be a braking system and/or a secondary steering assistance system.

According to one embodiment of the disclosure, the method may further comprise acquiring a camera image of the upcoming curve, and determining the lane boundaries from the camera image. Based on a captured camera image of an upcoming curve, the curvature and lane width of the curve can be determined using known image processing techniques. Thereby, the properties of the curve can be determined before the curve is reached, and the vehicle can be positioned in the lane so that the required safety distance is kept when the vehicle enters the curve. In addition to or instead of the camera, other means may be used for determining the characteristics of an upcoming curve. For example, the properties of a curve may be derived from map data in combination with GPS coordinates, radar, laser and/or inertial measurement unit (IMU) measurements. The camera is typically located to capture a forward looking mage of the road, aimed in the longitudinal direction of the vehicle. The acquired camera image may also be used to determine a longitudinal distance to the nearest lane boundary in the travel direction of the vehicle.

In one embodiment of the disclosure, the safety distance may be determined before entering the curve and be constant throughout the curve. This may be the case when the properties of the curve are known before the curve is reached and if the curve has substantially the same curvature throughout the curve.

In one embodiment of the disclosure, the step of determining the safety distance may be performed before entering said curve and throughout passage through said curve. An initial safety distance for entering the curve can be determined, after which the safety distance is updated depending on changing properties of the curve, the lane boundaries or of the surroundings. The safety distance may be updated continuously through the curve or intermittently at set intervals. If the safety changes throughout the curve, the vehicle is controlled to transition smoothly and gradually from one safety distance to the next so as to not create uncomfort of the occupants or unsafe traffic situations caused by rapid steering movements, According to a second embodiment of the disclosure, there is provided a steering assistance system in a vehicle, the system comprising; a curve identification module configured to detect an upcoming curve and to identify an inner and an outer lane boundary of the upcoming curve; a safety module configured to determine a safety distance between the vehicle and the outer lane boundary; and a vehicle positioning module configured to control a position of the vehicle in the curve with respect to the inner and outer lane boundary such that the vehicle is at a distance from the outer lane boundary which is equal to or larger than the safety distance.

The system may advantageously comprise at least one forward looking camera configured to detect an upcoming curve and to identify lane boundaries of the curve.

Effects and features of the second embodiment of the disclosure are largely analogous to those described above in connection with the first embodiment of the disclosure.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

The present disclosure will now be described in more detail, with reference to the appended drawings showing an example embodiment of the disclosure, wherein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

In the present detailed description, various embodiments of the system and method for determining a safety distance in a steering assistance system according to the present disclosure will be described with reference to an autonomous or semi-autonomous vehicle. That a vehicle is semi- or fully autonomous means that the vehicle is provided with control system for performing one or more driving tasks without any input required from the driver of the vehicle. Such driving tasks may include steering in the form of lane keeping and parking assist, and/or cruise control and distance keeping. In the present application, the vehicle is assumed to be provided with a steering assistance system which is at least capable of steering the vehicle through curves.

Figure 1:
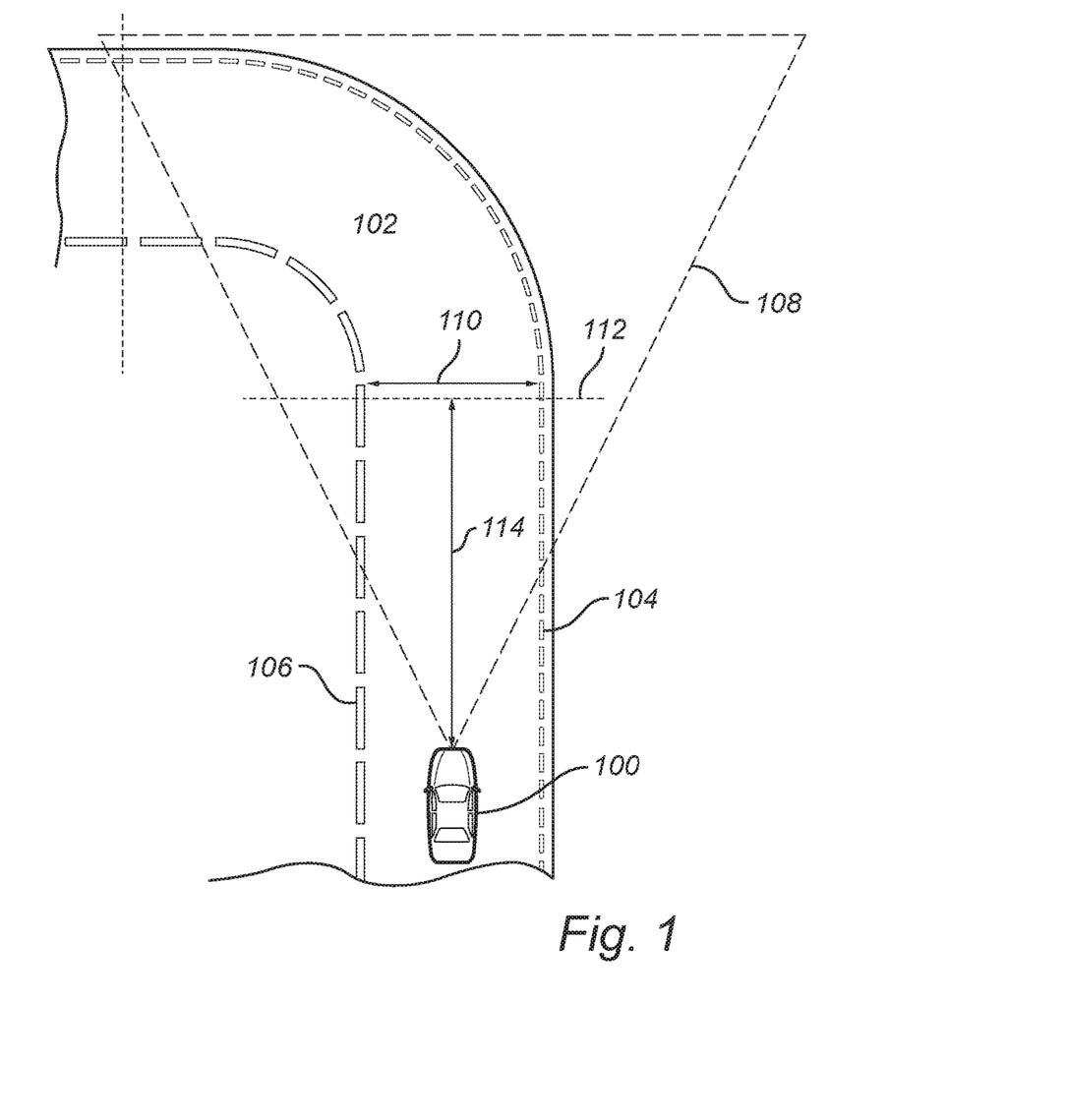
FIG. 1 schematically illustrates a vehicle comprising a steering assistance system according to an embodiment of the disclosure.

FIG. 1 is a schematic illustration of a vehicle 100 approaching a curve 102. For simplicity, only one lane is illustrated. The road comprises an outer lane boundary 104 and an inner lane boundary 106. For simplicity, only one lane is shown. However, various embodiments of the present disclosure are equally applicable for roads having any number of lanes in either direction, as long as there is some form of identifiable lane boundary separating adjacent lanes. The area 108 indicates an area detected by a camera arranged at the front of the vehicle. Instead or in addition to the camera, the vehicle may also be equipped with a forward pointing radar or IR-sensor.

When the vehicle approaches the curve, the camera captures images of the upcoming curve and by means of image processing functionality in the vehicle, certain properties of the curve can be determined, such as the width 110 of the curve, the starting point 112 of the curve, the distance 114 to the curve, and the curvature of at least the initial portion of the curve. Based on the information acquired by the camera, the steering assistance system can determine a safety distance between the vehicle 100 and the outer lane boundary 104 when entering the curve. Moreover, the steering assistance system may position the vehicle in the lane so that it is in the correct position when entering the curve. By positioning the vehicle prior to reaching the lane, the driver of the vehicle can feel confident in that the steering assistance system has identified the curve and that the vehicle is being correctly positioned during the approach to the curve for traveling through the curve in a safe manner.

Figure 2:
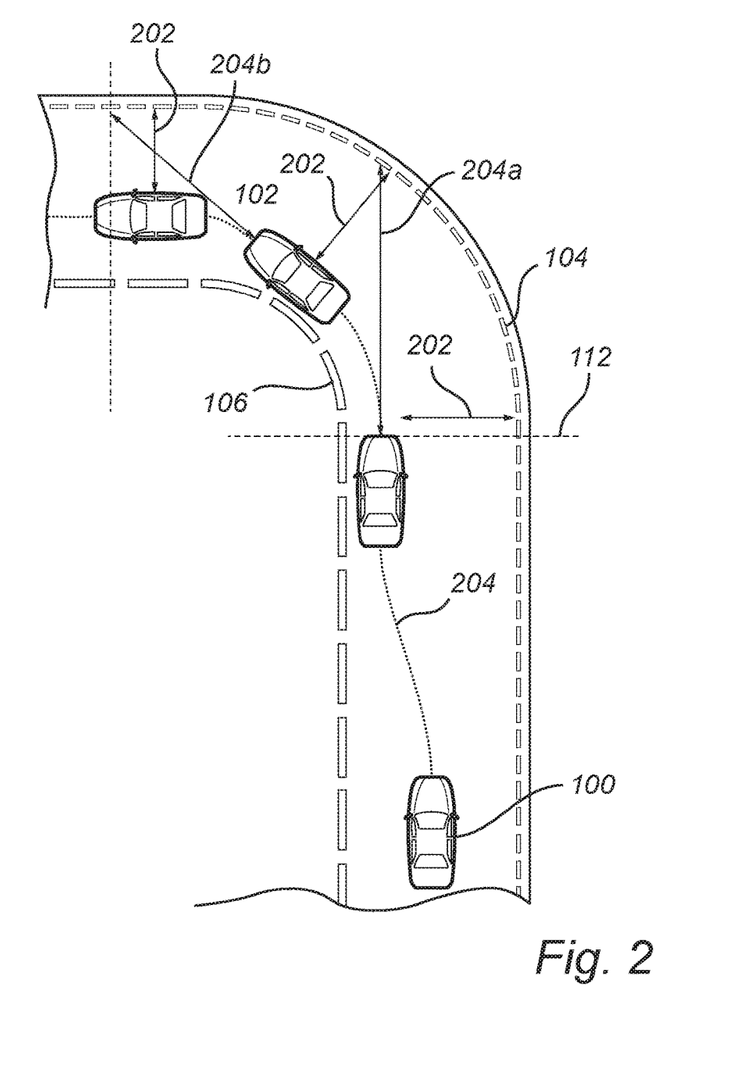
FIG. 2 schematically illustrates a vehicle travelling through a curve according to an embodiment of the inventive steering assistance method.

FIG. 2 outlines the general principle of the steering assistance method and system in further detail. Once the properties of the curve 102 have been identified, as described in relation to FIG. 1, the vehicle 100 can determine a safety distance for example as a lateral distance 202 between the vehicle and the outer lane boundary 104. For simplicity, the safety distance 202 is illustrated from the point of the vehicle being closest to the outer lane boundary 104. However, the vehicle reference point for the safety distance 202 may be taken as any point on the vehicle. To ensure that the safety distance 202 is not exceeded when reaching the starting point of the curve 102, the vehicle is positioned 204 towards the inner lane boundary 106 to be in the correct position when the curve is reached. Once in the curve, the vehicle 100 can for example maintain a constant distance to the outer lane boundary 104. Furthermore, a condition can be set so that the vehicle 100 is not too close to the inner lane boundary. Alternatively, the steering assistance system can use the inner lane boundary 106 as reference, and thereby maintain the safety distance by positioning the vehicle 100 a certain distance from the inner lane boundary 106.

In one embodiment, the safety distance can be defined based on the distance from the vehicle to the nearest lane boundary in the travel direction (longitudinal direction) of the vehicle 100. As illustrated in FIG. 2, the distances 204*a* and 204*b* from the vehicle to the outer lane boundary 104 in the travel direction of the vehicle 100 will change throughout the curve 102. Accordingly, a safety distance determined based on the longitudinal distance 204*a*, 204*b* to the outer lane boundary may change throughout the curve 102.

Figure 3:
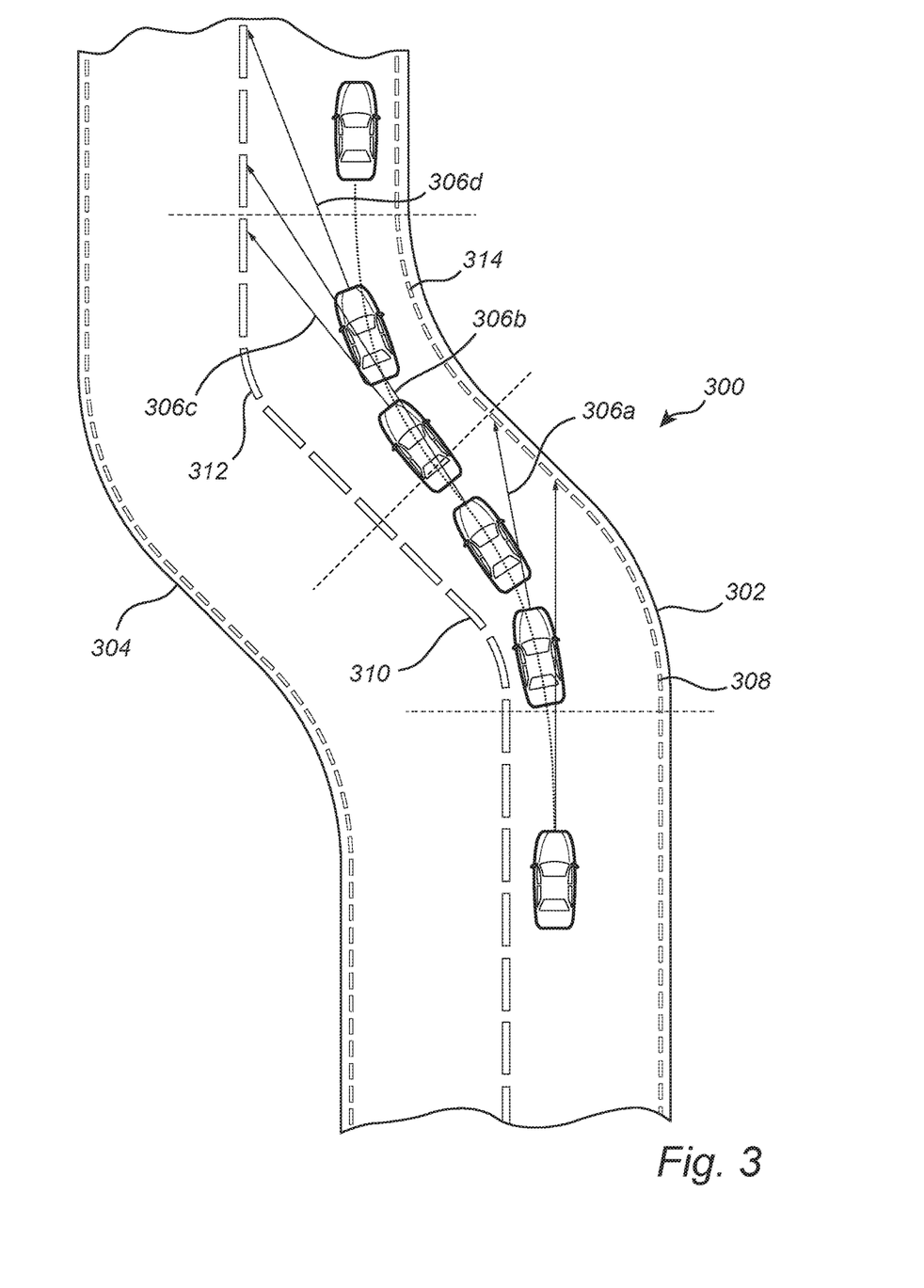
FIG. 3 schematically illustrates a vehicle travelling through a curve according to an embodiment of the inventive steering assistance method.

FIG. 3 is a schematic illustration of a vehicle 100 travelling through a double curve 300, turning first left and then right. The vehicle approaches the first curve 302 and determines a first safety distance based on a distance 306*a* from the vehicle 100 to the nearest lane boundary 308 in the travel direction of the vehicle 100, which is the outer lane boundary 308. The steering assistance system also positions the vehicle at an appropriate distance from the inner lane boundary 310.

When the vehicle has passed through a certain portion of the curve, the nearest lane boundary in the travel direction of the vehicle becomes the outer lane boundary 312 of the following curve 304 as illustrated by the distance 306*b*. Accordingly, distance to the nearest lane boundary in the travel direction of the vehicle changes throughout the curve, meaning that the basis for determining the safety distance also changes throughout the curve. In order to maintain an optimized safety distance, the safety distance can be determined and updated continuously throughout the curve. The sometimes abrupt changes in the distance to the nearest lane boundary in the travel direction of the vehicle, as illustrated by the arrows 306*a* and 306*b*, requires that the steering assistance system transforms such changes into a smooth transition in the lateral position of the vehicle in order to provide a safe and comfortable handling of the curve.

Furthermore, as the vehicle 100 continues through the curve, the distance 306*c* to the lane boundary 312 is again decreased before it increases 306*d* as the vehicle is leaving the curve.

The above examples are described assuming that a forward looking camera is the only source of information. However, the steering assistance system may use several other sources for acquiring information about the road and about upcoming curves. For example, the steering assistance system can use information from a GPS receiver to acquire information about the position of the vehicle, coupled to on-board map data which contains information of roads and curves.

Moreover, the steering assistance system can use information from an internal guidance system of the vehicle to determine e.g. an inclination of the vehicle. Furthermore, road surface information can be acquired from temperature sensors, rain sensors etc. to gather information about the friction of the road surface and the occurrence of snow ice or water.

All information from the abovementioned sensors can be coupled to the steering assistance system and be taken into consideration when determining a safety distance.

In addition to determining the safety distance, the steering assistance system of the vehicle can be connected to velocity control functionality of the vehicle in order to control the speed of the vehicle. In particular, if the steering assistance system estimates that the safety distance cannot be maintained under current conditions, the steering assistance system can control the speed of the vehicle so that the safety conditions can be met.

Based on the known information about the curve, road surface and vehicle velocity, the steering assistance system can then determine the safety distance taking a further condition into account. That condition may be that the vehicle should be able to make to a complete stop before reaching the lane boundary, or that the vehicle should be able to brake so that it does not exceeds a predetermined velocity, such as 30 km/h, when it reaches the lane boundary, assuming the vehicle continues in the current travel direction. The steering assistance system can also combine steering with braking.

For example, if it has been determined that the outer lane boundary comprises a barrier such as a wire rope barrier, the steering assistance can set the safety distance so that the vehicle is capable of reducing the velocity to a sufficient degree so that a collision with the wire rope barrier is safe for the occupants of the vehicle.

The steering assistance system may also be capable of identifying what lies beyond the lane boundaries, in which case also that information is taken into account when determining the safety distance.

Figure 4:
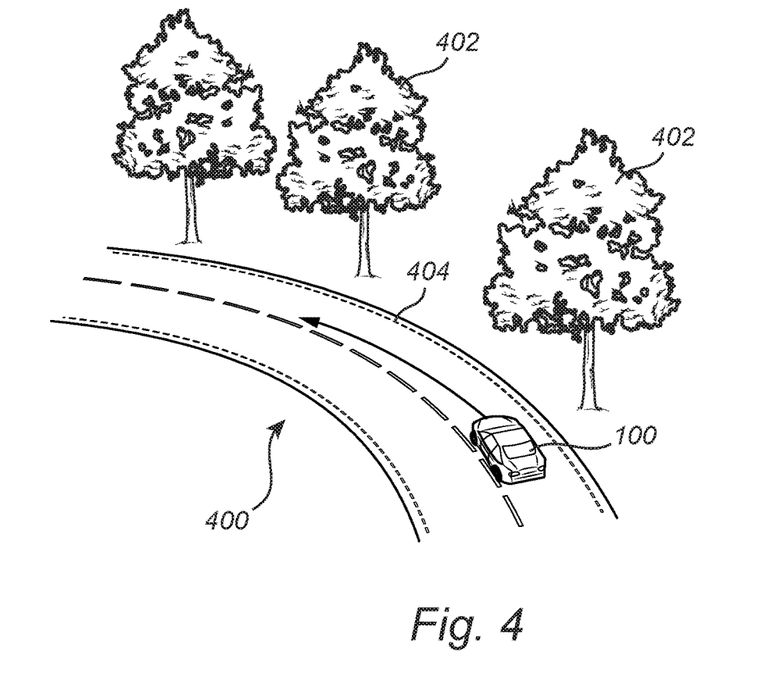
FIG. 4 schematically illustrates a vehicle travelling through a curve according to an embodiment of the inventive steering assistance method.

FIG. 4 schematically illustrates a curve 402 where there are trees close to the outer lane boundary 404. The occurrence of a potentially dangerous obstacle just beyond of the outer lane boundary may for example cause the steering assistance system to position the vehicle closer to the inner lane boundary, and/or to reduce the speed of the vehicle, to be able to maintain the determined safety distance.

Figure 5:
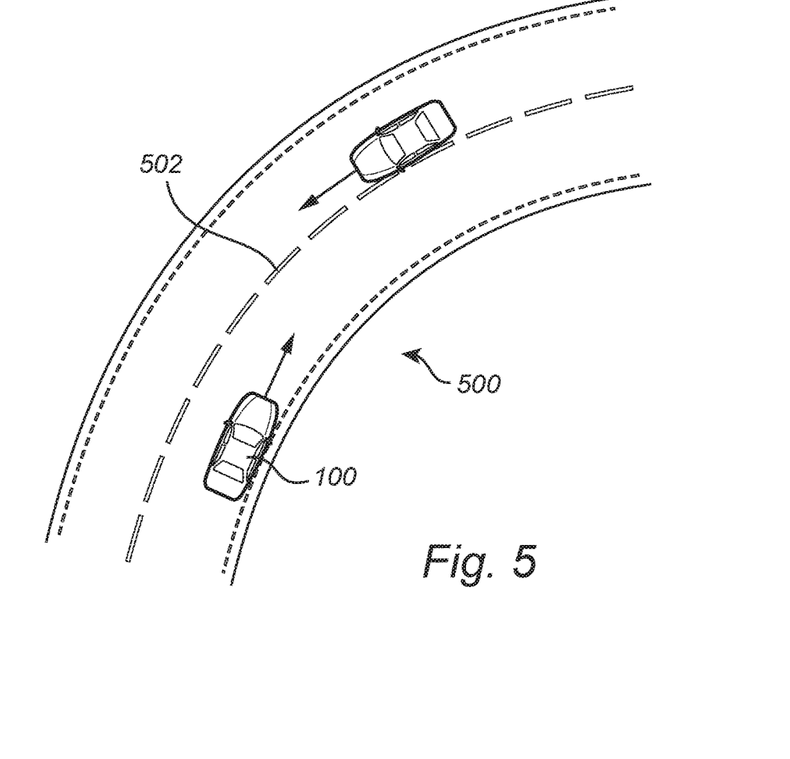
FIG. 5 schematically illustrates a vehicle travelling through a curve according to an embodiment of the inventive steering assistance method.

In FIG. 5, the vehicle 100 is illustrated as traveling through a curve 500 where oncoming traffic is present beyond the outer lane boundary 502. This is a situation where it is crucial that the vehicle does not cross into the adjacent lane, and the safety distance can be set accordingly based on the knowledge that there may be oncoming traffic.

Figure 6:
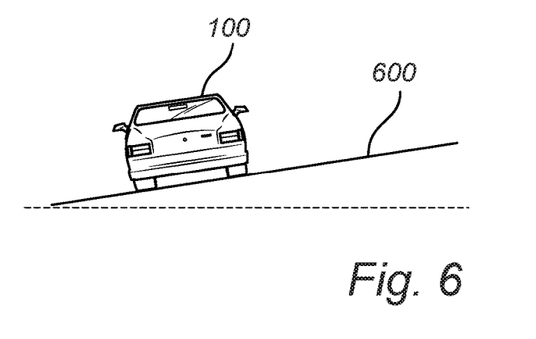
FIG. 6 schematically illustrates a vehicle comprising a steering assistance system according to an embodiment of the disclosure.

FIG. 6 illustrates a vehicle 100 traveling through a curve 600 having a cant, i.e. an inclination towards the outer lane boundary. An on-board internal guidance system can detect inclined curves, or knowledge about the geometry of curves can be pre-stored in a map database. The inclination of the curve will result in a slightly shorter braking distance of the vehicle, and the safety distance can be correspondingly reduced compared to when travelling through a flat curve.

Figure 7:
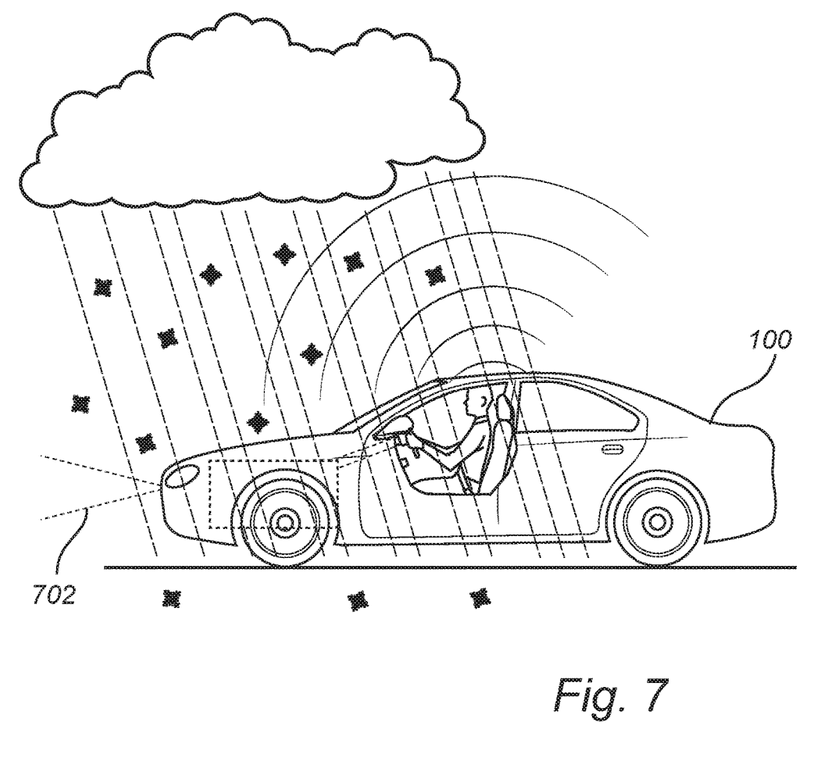
FIG. 7 schematically illustrates a vehicle comprising a steering assistance system according to an embodiment of the disclosure.

FIG. 7 schematically illustrates a vehicle comprising a forward looking camera 702 for capturing a image of the road ahead in the travel direction of the vehicle, a GPS module and various environment sensors such as a rain sensor and a temperature sensor. By using the information from all the available sensors, the steering assistance system can optimize the safety distance so that the vehicle can travel safely through a curve, at a position with respect to the lane boundaries so that there is sufficient time/distance to take corrective action or stop the vehicle in the event that some part of the steering assistance system should fail.

It should be noted that the system, curve identification module, safety module, vehicle positioning module and/or any other system, module, unit or the like described herein may comprise a combination of analog and digital circuits and/or one or more processors or processing units and memory configured with software and/or firmware, e.g., stored in the memory, that when executed by the one or more processors or processing units perform the functions and/or operations described herein. One or more of such processors or processing units, as well as other hardware, may be included in a single ASIC (Application-Specific Integrated Circuitry), or several processors or processing units and various hardware may be distributed among several separate components, whether individually packaged or assembled into a SoC (System-on-a-Chip).

Figure 8:
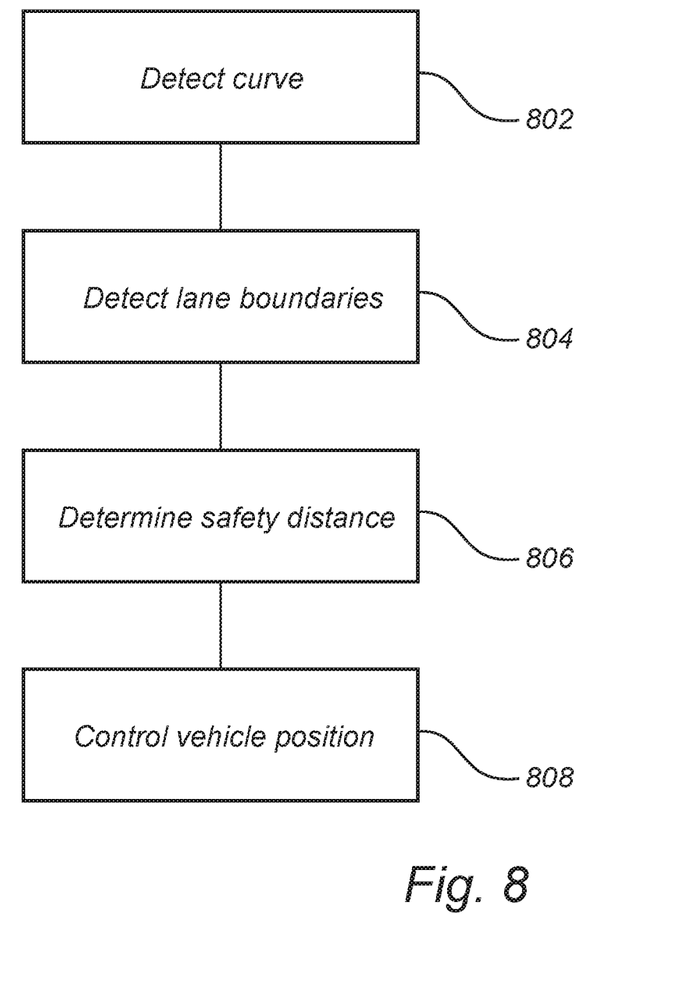
FIG. 8 is a flow chart outlining the general steps of the method according to an embodiment of the disclosure.

FIG. 8 is a flow chart outlining the general steps of the method according to an embodiment of the disclosure. In a first step 802, an upcoming curve is detected, for example using an onboard camera, and/or by using map and positional information. From the acquired information, at least the location of the inner and the outer lane boundary of the detected curve is determined 804. Next, 804, the safety distance is determined. The safety distance (a lateral or longitudinal distance to a lane boundary) at a current or future longitudinal position along the road may be determined by first determining a threat measure x. A candidate distance is a safe distance if the threat measure x is smaller than a threshold y. Accordingly, the candidate distance can be set as the safety distance if the threat measure condition is fulfilled.

Threat measures and thresholds can be determined based either on the distance to the closest lane boundary in the travel direction (longitudinal distance) of the vehicle or on the distance in the direction perpendicular to the travel direction (lateral distance). Determining the longitudinal distance to the nearest lane boundary may require knowledge about the vehicle heading angle, or the distance may be determined for example by radar. In this case, the threshold y may be the stopping distance of the vehicle thus making it possible for the vehicle to stop within lane in case of steering fault. The stopping distance may include the distance travelled while detecting the fault.

The threshold y may also be the time needed to detect the fault, switch to a backup strategy and execute the backup strategy. For example the time to detect an error in the electrical power steering, switch to differential braking and execute a differential braking maneuver which keeps the vehicle in the lane.

When the above threat measures are determined, the consequence of violating the constraint, e.g. crossing the lane boundary, may be taken into account. For instance, if the area outside of the boundary is hazardous (e.g. oncoming traffic), the threat measures can be more conservative and consider very rare faults (e.g. assume that worst-case time delay to detect fault). In the opposite situation, when the area outside of the boundary is non-hazardous (e.g. grass), the threat measure calculation can be made less conservative.

The above described algorithms for determining a safety distance may be performed only on a single (e.g. the current) vehicle position. They may also be evaluated over a predicted vehicle trajectory and the output would then be e.g. a set of future safety distances over the predicted longitudinal position or a specific longitudinal and lateral trajectory which does not violate the safety distance (or e.g. maximize the margin to the safe distance).

Note that the threat measure may be dependent on the vehicle heading angle meaning that the vehicle position only may not be sufficient to determine whether or the lateral distance is safe or not.

When the safety distance has been determined, the steering assistance controls 808 the position vehicle in the curve with respect to the outer lane boundary such that the vehicle is at a distance from the outer lane boundary which is equal to or larger than the safety distance.

Even though the disclosure has been described with reference to specific exemplifying embodiments thereof, many different alterations, modifications and the like will become apparent for those skilled in the art. Also, it should be noted that parts of the system and method may be omitted, interchanged or arranged in various ways, the system and method yet being able to perform the functionality of the present disclosure.

Additionally, variations to the disclosed embodiments can be understood and effected by the skilled person in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for steering assistance in a vehicle, the method comprising;
   identifying, using a camera, an upcoming curve;
   detecting, using the camera, an inner lane boundary and an outer lane boundary of the upcoming curve;
   determining a safety distance as a lateral distance between the vehicle and the outer lane boundary, wherein the safety distance is determined based on a longitudinal distance to the outer lane boundary of the upcoming curve; and
   controlling, using a vehicle steering assistance system, a position of the vehicle in the curve with respect to the outer lane boundary such that the vehicle is at a distance from the outer lane boundary which is equal to or larger than the safety distance.

2. The method according to claim 1 further comprising positioning the vehicle in the lane, before entering the curve, so that a distance between the vehicle and the outer lane boundary is larger than or equal to the safety distance when the vehicle enter the curve.

3. The method according to claim 1 wherein the safety distance is determined such that the vehicle is positioned closer to the inner lane boundary than to the outer lane boundary.

4. The method according to claim 1 wherein the safety distance is based on a velocity of the vehicle.

5. The method according to claim 1 wherein the safety distance is based on a curvature of the curve.

6. The method according to claim 1 wherein the safety distance is based on road surface conditions of the curve.

7. The method according to claim 1 wherein the safety distance is based on an inclination angle of the road.

8. The method according to claim 1 wherein the safety distance is equal to or larger than an estimated braking distance of the vehicle.

9. The method according to claim 1 wherein the safety distance is based on properties of the outer lane boundary and/or on an evaluation of objects beyond the outer lane boundary.

10. The method according to claim 1 wherein the safety distance is determined based on properties of an auxiliary system.

11. The method according to claim 1 further comprising acquiring a camera image of the upcoming curve, and determining the lane boundaries from the camera image.

12. The method according to claim 1 wherein the safety distance is determined before entering the curve and being maintained to be constant throughout the curve.

13. The method according to claim 1 wherein the step of determining the safety distance is performed before entering the curve and throughout passage through the curve.

14. A steering assistance system for a vehicle, the system comprising;
   a curve identification module configured to detect an upcoming curve and to identify an inner lane boundary and an outer lane boundary of the upcoming curve;
   a safety module configured to determine a safety distance as a lateral distance between the vehicle and the outer lane boundary, wherein the safety distance is determined based on a longitudinal distance to the outer lane boundary of the upcoming curve; and
   a vehicle positioning module configured to control a position of the vehicle in the curve with respect to the inner and outer lane boundaries such that the vehicle is at a distance from the outer lane boundary which is equal to or larger than the safety distance.

15. The system according to claim 14 further comprising at least one forward looking camera configured to detect an upcoming curve and to identify lane boundaries of the curve.

* * * * *

UNITED STATES PATENT AND TRADEMARK OFFICE
CERTIFICATE OF CORRECTION

PATENT NO. : 9,926,011 B2
APPLICATION NO. : 15/172300
DATED : March 27, 2018
INVENTOR(S) : Peter Harda et al.

Page 1 of 1

It is certified that error appears in the above-identified patent and that said Letters Patent is hereby corrected as shown below:

In the Claims

Column 10, Line 57, Claim 2:
After "when the vehicle"
Delete "enter" and
Insert -- enters --.

Signed and Sealed this
Twenty-fourth Day of July, 2018

Andrei Iancu
*Director of the United States Patent and Trademark Office*